(12) United States Patent
Won et al.

(10) Patent No.: US 10,772,104 B2
(45) Date of Patent: Sep. 8, 2020

(54) WIRELESS COMMUNICATION DEVICE AND SYMBOL-BASED PROCESSING METHOD FOR DOWNLINK SIGNALS THEREOF

(71) Applicant: SAMSUNG ELECTRONICS CO., LTD., Suwon-si, Gyeonggi-do (KR)

(72) Inventors: Young-Gul Won, Hwaseong-si (KR); Jung-Ho Lee, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/227,534

(22) Filed: Dec. 20, 2018

(65) Prior Publication Data

US 2019/0200362 A1 Jun. 27, 2019

(30) Foreign Application Priority Data

Dec. 21, 2017 (KR) .................... 10-2017-0177485
Aug. 17, 2018 (KR) .................... 10-2018-0096124

(51) Int. Cl.
| | | |
|---|---|---|
| *H04L 12/28* | (2006.01) | |
| *H04W 72/08* | (2009.01) | |
| *H04W 72/04* | (2009.01) | |
| *H04L 5/00* | (2006.01) | |
| *H04L 27/26* | (2006.01) | |

(Continued)

(52) U.S. Cl.
CPC .......... *H04W 72/08* (2013.01); *H04L 5/0048* (2013.01); *H04L 25/02* (2013.01); *H04L 27/26* (2013.01); *H04W 72/0446* (2013.01); *H04L 5/0023* (2013.01)

(58) Field of Classification Search
CPC . H04L 5/0053; H04L 25/0256; H04W 72/042
USPC ................................ 370/252, 329, 386, 430
See application file for complete search history.

(56) References Cited

U.S. PATENT DOCUMENTS

2011/0182329 A1  7/2011  Wehinger
2011/0317581 A1* 12/2011  Hoshino ............... H04L 5/0082
                                                         370/252

(Continued)

FOREIGN PATENT DOCUMENTS

KR       10-1187073        9/2012
KR       1020170001489     1/2017

(Continued)

*Primary Examiner* — John Pezzlo
(74) *Attorney, Agent, or Firm* — F. Chau & Associates, LLC (57) ABSTRACT

A symbol-based processing method for downlink signals of a wireless communication device includes receiving a first downlink signal including a plurality of symbols, detecting a physical downlink shared channel (PDSCH) from the first downlink signal, performing a first channel estimation operation using a first reference signal for demodulating the PDSCH, performing a second channel estimation operation on at least one second symbol between at least two first symbols included in a symbol group unit based on a result of the first channel estimation operation, each time the first channel estimation operation on the symbol group unit is completed, and performing a demodulation operation on the PDSCH based on a result of the second channel estimation operation.

17 Claims, 11 Drawing Sheets

(51) Int. Cl.
*H04L 25/02* (2006.01)
*H04J 1/16* (2006.01)

(56) References Cited

U.S. PATENT DOCUMENTS

| | | | |
|---|---|---|---|
| 2014/0086202 A1* | 3/2014 | Nagata | H04W 72/042 |
| | | | 370/330 |
| 2014/0247775 A1* | 9/2014 | Frenne | H04L 5/0048 |
| | | | 370/329 |
| 2015/0098341 A1 | 4/2015 | Ramkumar et al. | |
| 2015/0282192 A1 | 10/2015 | Shin et al. | |
| 2016/0182202 A1 | 6/2016 | Patel et al. | |
| 2016/0338046 A1 | 11/2016 | Chen et al. | |
| 2017/0149542 A1 | 5/2017 | Lee et al. | |
| 2017/0171897 A1 | 6/2017 | Ryu et al. | |
| 2017/0238312 A1 | 8/2017 | Chen et al. | |
| 2018/0109353 A1 | 4/2018 | Kwak et al. | |
| 2019/0222246 A1* | 7/2019 | Takahashi | H04B 7/0854 |

FOREIGN PATENT DOCUMENTS

| | | |
|---|---|---|
| KR | 1020170059911 | 5/2017 |
| KR | 1020170097050 | 8/2017 |

\* cited by examiner

WIRELESS COMMUNICATION DEVICE AND SYMBOL-BASED PROCESSING METHOD FOR DOWNLINK SIGNALS THEREOF

CROSS-REFERENCE TO RELATED APPLICATIONS

This application claims priority under 35 U.S.C. § 119 to Korean Patent Application Nos. 10-2017-0177485 and 10-2018-0096124, respectively filed on Dec. 21, 2017 and Aug. 17, 2018 in the Korean Intellectual Property Office, the disclosures of which are incorporated by reference herein in their entireties.

TECHNICAL FIELD

Exemplary embodiments of the inventive concept relate to a wireless communication device, and more particularly, to a wireless communication device configured to process downlink signals.

DISCUSSION OF RELATED ART

With research and development of communication technology, $5^{th}$-generation (or 5G) communication technology is the next step after $4^{th}$-generation (4G) communication technology (e.g., long-term evolution (LTE) communication technology). 5G communication technology may support multiple numerology and flexible frame structures for various services and scenarios, such as enhanced mobile broadband (eMBB) or ultra-reliable low-latency communication (URLLC).

SUMMARY

According to an exemplary embodiment of the inventive concept, in a symbol-based processing method for downlink signals of a wireless communication device, the method includes receiving a first downlink signal including a plurality of symbols, detecting a physical downlink shared channel (PDSCH) from the first downlink signal, performing a first channel estimation operation using a first reference signal for demodulating the PDSCH, performing a second channel estimation operation on at least one second symbol between at least two first symbols included in a symbol group unit based on a result of the first channel estimation operation, each time the first channel estimation operation on the symbol group unit is completed, and performing a demodulation operation on the PDSCH based on a result of the second channel estimation operation.

According to an exemplary embodiment of the inventive concept, a wireless communication device includes a radio-frequency (RF) integrated circuit configured to receive a first downlink signal from a base station, a buffer configured to store information required for processing the first downlink signal, and a baseband processor configured to process the first downlink signal. The baseband processor performs a channel estimation operation on a first symbol group of a first reference signal for demodulating a physical downlink shared channel (PDSCH) of the first downlink signal, performs a channel estimation operation on at least one second symbol between at least two first symbols included in the first symbol group based on a result of the channel estimation operation, and performs a demodulation operation on the at least one second symbol.

According to an exemplary embodiment of the inventive concept, a non-transitory processor-readable storage medium includes commands. When the commands are executed by a processor included in a wireless communication device, the processor detects a PDSCH from a first downlink signal that is externally received, performs a first channel estimation operation using a first reference signal for demodulating the PDSCH, performs a second channel estimation operation on at least one second symbol between at least two first symbols included in a symbol group unit based on a result of the first channel estimation operation, each time the first channel estimation operation on the symbol group unit is completed, and performs a demodulation operation on the PDSCH based on a result of the second channel estimation operation.

BRIEF DESCRIPTION OF THE DRAWINGS

The above and other features of the inventive concept will be more clearly understood by describing in detail exemplary embodiments thereof with reference to the accompanying drawings.

DETAILED DESCRIPTION OF THE EXEMPLARY EMBODIMENTS

Exemplary embodiments of the inventive concept provide a wireless communication device configured to process a downlink signal suitable for a low-latency service to improve a processing speed and memory use efficiency, and a processing method of the wireless communication device.

Exemplary embodiments of the inventive concept will be described more fully hereinafter with reference to the accompanying drawings. Like reference numerals may refer to like elements throughout this application.

Figure 1:
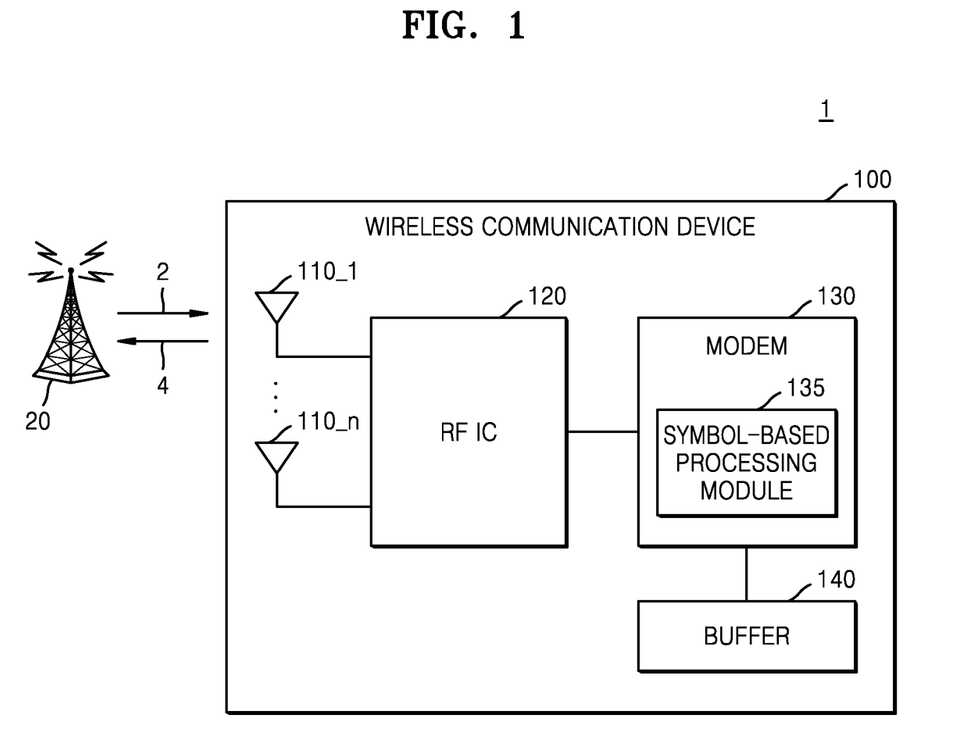
FIG. 1 is a block diagram of a wireless communication system according to an exemplary embodiment of the inventive concept.

FIG. 1 is a block diagram of a wireless communication system according to an exemplary embodiment of the inventive concept.

A wireless communication system 1 may be, for example, a long-term evolution (LTE) system, a 5$^{th}$-generation (5G) system, a Code Division Multiple Access (CDMA) system, a Global System for Mobiles (GSM) system, a wireless local area network (WLAN) system, or another arbitrary wireless communication system. Hereinafter, the wireless communication system 1 will mainly be described as a 5G system, but it will be understood that the inventive concept is not limited thereto.

Referring to FIG. 1, the wireless communication system 1 may include a wireless communication device 100 and a base station 20. The wireless communication device 100 and the base station 20 may communicate with each other through a downlink channel 2 and an uplink channel 4. The wireless communication device 100 may include a plurality of antennas 110_1 to 110_n, a radio-frequency integrated circuit (RF IC) 120, a modem 130, and a buffer 140.

The wireless communication device 100 may refer to one of various devices capable of communicating with the base station 20, and transmitting and receiving a data signal and/or control information. For example, the wireless communication device 100 may be variously referred to as user equipment (UE), a mobile station (MS), a mobile terminal (MT), a user terminal (UT), a subscriber station (SS), or a handheld device. The base station 20 may refer to a fixed station configured to communicate with the wireless communication device 100 and/or another base station. The base station 20 may be referred to as a Node B, an evolved-Node B (eNB), a base transceiver system (BTS), or an access point (AP).

Wireless communication networks between the wireless communication device 100 and the base station 20 may share available network resources and support the communication of a plurality of users. For example, in the wireless communication networks, information may be transmitted using various methods, such as CDMA, frequency division multiple access (FDMA), time division multiple access (TDMA), orthogonal frequency division multiple access (OFDMA), or single-carrier frequency division multiple access (SC-FDMA). Hereinafter, wireless communication between the wireless communication device 100 and the base station 20 will mainly be described with reference to the application of 5G communication technology. However, the inventive concept is not limited thereto, and it is apparent that exemplary embodiments may be applied to next-generation communication technologies other than 5G communication technology.

The RF IC 120 may receive control information and/or a downlink signal including a data signal from the base station 20 through the plurality of antennas 110_1 to 110_n. The RF IC 120 may include a low-noise amplifier (LNA) configured to amplify the downlink signal and a mixer configured to down-convert a frequency of the downlink signal. The RF IC 120 may down-convert an RF-band downlink signal into a baseband downlink signal, and provide the baseband downlink signal to the modem 130.

The modem 130 according to the present exemplary embodiment may include a symbol-based processing module 135. The symbol-based processing module 135 may be embodied by hardware, such as a specific application integrated circuit (IC), a field-programmable gate array, a combination of logic gates, a System-on-Chip (SoC), or various types of processing circuits (or a control circuit). Furthermore, the symbol-based processing module 135 may be embodied by software, such as commands and code that may be executed by a processor (e.g., the modem 130). The modem 130 may execute the symbol-based processing module 135 and perform a symbol-based processing operation. The symbol-based processing module 135 may be stored in a memory included in the modem 130 or a storage device, or stored in the buffer 140 of the wireless communication device 100. A processor (or a baseband processor), such as the modem 130, may access a memory, a storage device, or a buffer in which the symbol-based processing module 135 may be stored, and read the symbol-based processing module 135. A symbol-based processing operation of the modem 130, which will be described below, may be performed based on the symbol-based processing module 135 that is embodied by hardware or software.

In an exemplary embodiment of the inventive concept, the modem 130 may perform a symbol-based processing operation on a downlink signal received from the RF IC 120. The symbol-based processing operation may include a series of operations, such as a channel estimation operation, a decoding operation, or a demodulation operation, on the downlink signal. The symbol-based processing operation may refer to performing a processing operation in units of predetermined symbol groups in a frame structure that is newly defined to conform to a 5G-communication low-latency service. Hereinafter, the downlink signal may correspond to one transmission time interval (TTI), and a length of the TTI may be variable according to a communication environment of the wireless communication device 100. For example, a first downlink signal may correspond to a first TTI, and a second downlink signal may correspond to a second TTI. The TTI will be described in detail below with reference to FIGS. 2A and 2B.

The modem 130 may detect a physical downlink shared channel (PDSCH) including a data signal from the downlink signal. To detect the PDSCH, the modem 130 may preferentially process a physical downlink control channel (PDCCH) including control information required for detecting the PDSCH, obtain the control information, and detect the PDSCH based on the obtained control information. The PDCCH may be an enhanced PDCCH (EPDCCH) depending on a transmission mode of the wireless communication device 100. However, the inventive concept is not limited thereto, and the PDCCH may correspond to various control channels. The modem 130 may perform a first channel estimation operation using a reference signal for demodulating the PDSCH. The reference signal for demodulating the PDSCH may be a demodulation-reference signal (DM-RS) and may be transmitted only inside a resource block assigned for the PDSCH and the PDCCH transmitted to the wireless communication device 100.

The modem 130 may perform a second channel estimation operation on at least one second symbol between at least two first symbols included in a predetermined symbol group unit based on a result of the first channel estimation operation, each time the first channel estimation operation on the predetermined symbol group unit is completed. The symbol group may refer to a set of symbols, which are grouped for a symbol-based processing operation, from among a plurality of symbols corresponding to the reference signal for demodulating the PDSCH. A symbol group unit may be variable according to a communication environment of the wireless communication device 100 and may correspond to a mini-slot unit in a frame structure corresponding to a downlink signal. Additionally, two adjacent symbol groups on a time axis may include the same symbol. However, the inventive concept is not limited thereto, and the symbol group unit may be variously defined according to a service policy of the 5G communication. In other words, the modem 130 may perform the second channel estimation operation on the second symbol immediately after the first channel estimation operation on the symbol group is completed. The second symbol may be a symbol located in the PDSCH and include a modulated data signal (or data bit).

The modem 130 may demodulate the PDSCH based on a result of the second channel estimation operation. Specifically, the modem 130 may demodulate the second symbol of each symbol group, each time the second channel estimation operation on the second symbol of each symbol group is completed. Hereinafter, the demodulation of the PDSCH of the modem 130 may include generating and decoding log likelihood ratios (LLRs) of symbols located in the PDSCH. As a result of the demodulation of the PDSCH of the downlink signal, the modem 130 may obtain a data signal and provide the data signal to an application processor of the wireless communication device 100. For example, the modem 130 may be embodied by an application processor and one SoC, and the SoC may perform an operation of the modem 130 along with an operation of the application processor.

The buffer 140 may store information required for processing a downlink signal. The modem 130 may access the buffer 140, manage the updating of the stored information, and read information stored in the buffer 140. In an exemplary embodiment of the inventive concept, the buffer 140 may have such a capacity as to store information required for processing a downlink signal of one TTI, and the modem 130 may manage information of the buffer 140 to efficiently use a limited capacity. Hereinafter, a case in which information required for processing a downlink signal includes results of channel estimation operations on the downlink signal will mainly be described. However, the inventive concept is not limited thereto, and the information required for processing the downlink signal may include various pieces of information.

For example, when the buffer 140 stores results of channel estimation operations on an N-th downlink signal corresponding to an N-th TTI, the modem 130 may overwrite, in the order of generation, channel estimation results of an N+1-th downlink signal, which are generated by processing an N+1-th downlink signal corresponding to an N+1-th TTI subsequent to the N-th TTI, in the buffer 140 in which channel estimation results of the N-th downlink signal are stored, and perform updating. The above-described operation will be described in detail with reference to FIG. 8.

The modem 130 according to the present exemplary embodiment may perform a symbol-based processing operation suitable for a 5G-communication frame structure on the downlink signal and provide rapid data services to users. Additionally, the modem 130 may efficiently use a memory of the buffer 140 included in the wireless communication device 100 and minimize a capacity of the buffer 140. As a result, the wireless communication device 100 may be made lightweight, and manufacturing costs of the wireless communication device 100 may be reduced.

Figure 2A:
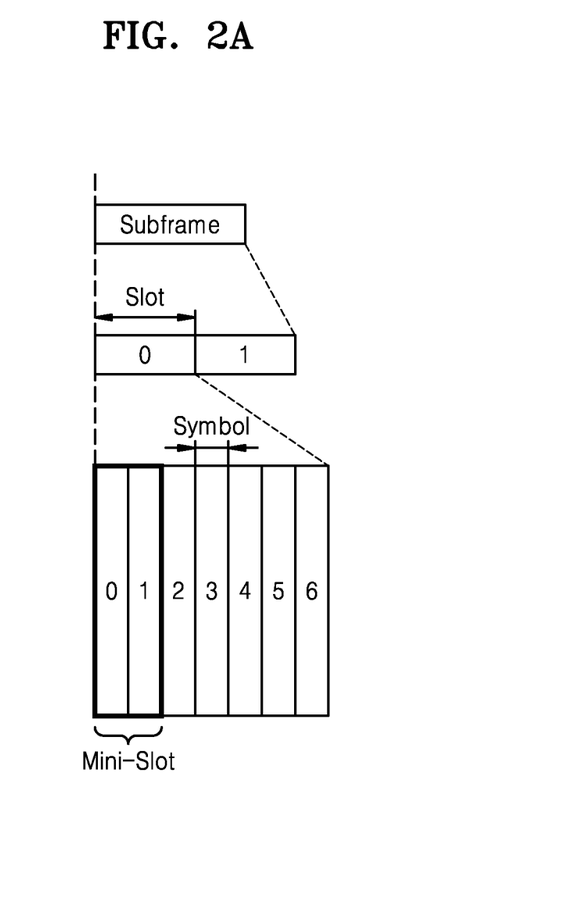
FIGS. 2A and 2B are diagrams of structures of $5^{th}$-generation (5G)-communication frames according to exemplary embodiments of the inventive concept.
Figure 2B:
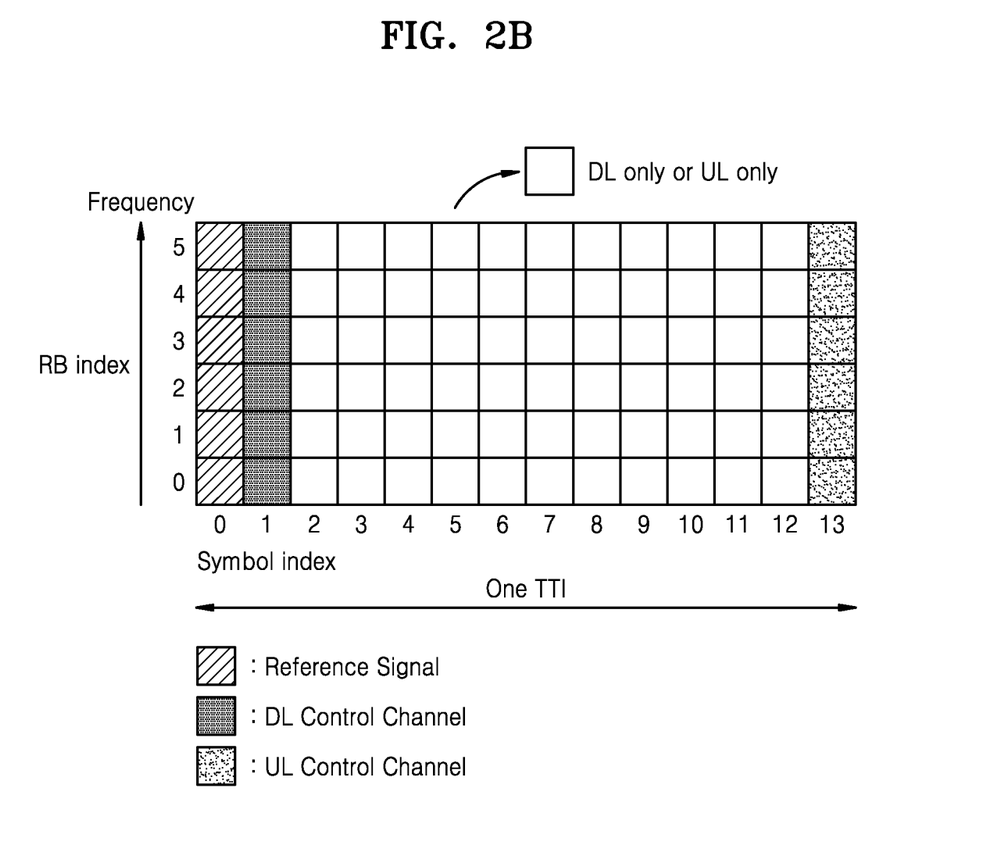

FIGS. 2A and 2B are diagrams of structures of 5G-communication frames according to exemplary embodiments of the inventive concept.

Referring to FIG. 2A, one subframe (or a radio frame) may include a plurality of slots Slot. In an example, one subframe may include two slots Slot. One slot may include a plurality of symbols. In an example, one slot may include seven symbols. However, the inventive concept is not limited to the exemplary embodiment of FIG. 2A, and the slot may include a different number of symbols according to a unit distance (e.g., a subcarrier spacing) between subcarriers for the 5G communication. Additionally, at least one symbol included in one slot may be divided into mini-slots, and a mini-slot may be defined as one unit for a 5G-communication-based low-latency service. The modem 130 of FIG. 1 may determine (or change) a symbol group unit to correspond to the number of symbols included in the mini-slot. The above-described structure of the subframe may be referred to as a self-contained subframe structure.

Referring to FIG. 2B, one TTI may correspond to a length of one subframe. In an example, the subframe may include fourteen symbols during one TTI. The subframe may include a reference signal used to estimate channels of a downlink signal, a downlink (DL) control channel, an uplink (UL) control channel, and symbols (or PDSCHs) for transmitting downlink data. Although FIG. 2B illustrates an example in which the reference signal is located in a first symbol 0 of the subframe, a downlink (DL) control channel (or PDCCH) is located in a second symbol 1 of the subframe, and an uplink (UL) control channel (or PUCCH) is located in a final symbol 13 of the subframe, the inventive concept is not limited thereto. Downlink transmission and uplink transmission may be sequentially performed by applying the structure of the subframe and a time division duplexing (TDD) method.

A specific resource block RB may be assigned to a specific wireless communication device in the 5G communication. Thus, when a downlink signal is transmitted to the wireless communication device in the 5G communication, one transmission block may be used. When the wireless communication device processes a received downlink signal, an LLR generation operation may be performed on one codeword corresponding to one transmission block.

The reference signal may include a first reference signal used to estimate a channel for demodulating the PDCCH and a second reference signal used to estimate a channel for demodulating the PDSCH. The first reference signal and the second reference signal may be separately located in different symbols of the subframe. For example, to preferentially perform the demodulation of the PDCCH, the first reference signal may be located in symbols at stages that precede the second reference signal in the subframe.

Figure 3:
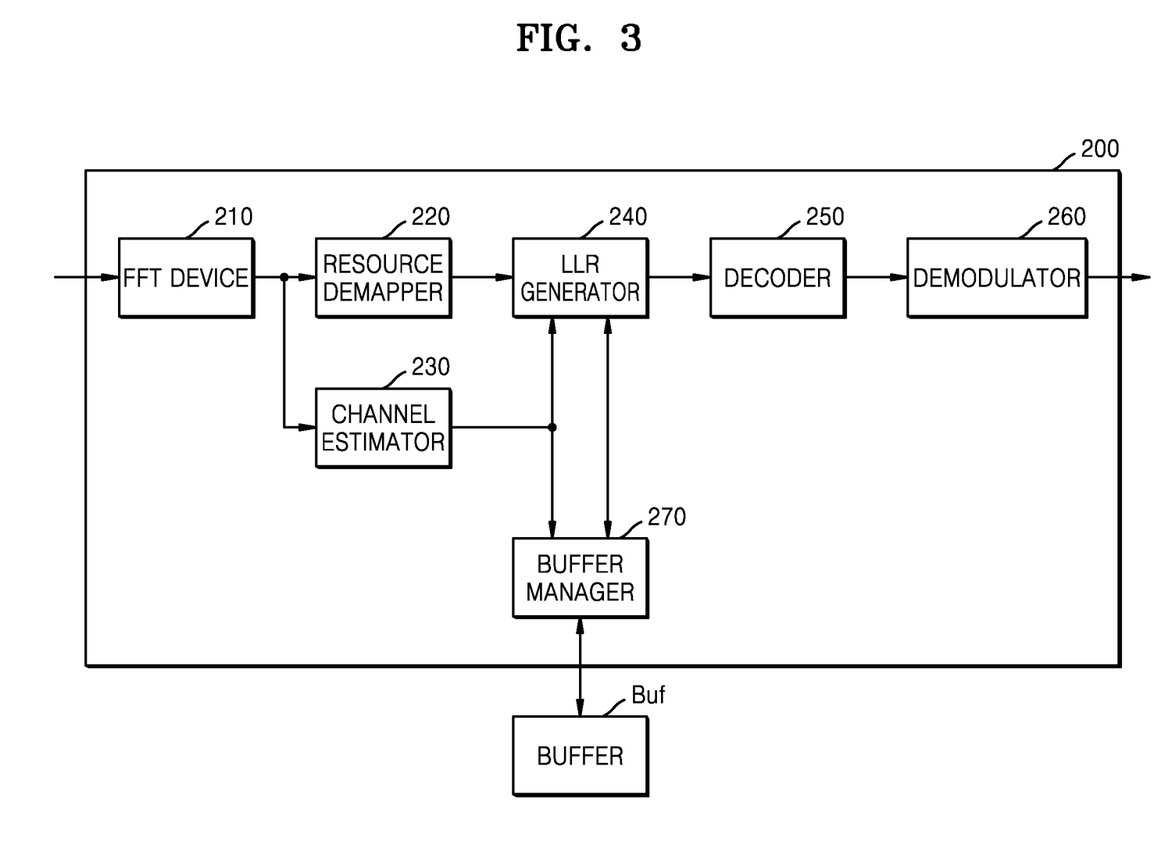
FIG. 3 is a detailed block diagram of a modem according to an exemplary embodiment of the inventive concept.

FIG. 3 is a detailed block diagram of a modem according to an exemplary embodiment of the inventive concept.

Referring to FIG. 3, a modem 200 may include a fast Fourier transform (FFT) device 210, a resource demapper 220, a channel estimator 230, a log likelihood ratio (LLR) generator 240, a decoder 250, a demodulator 260, and a buffer manager 270. The FFT device 210 may perform an FFT operation on a received downlink signal and provide the FFT result to the resource demapper 220 and the channel estimator 230. The resource demapper 220 may detect a downlink signal, which is mapped to a related resource area, from among input downlink signals and provide the detected downlink signal to the LLR generator 240. The resource demapper 220 may detect the downlink signal, which is mapped to a physical resource area, from among a plurality of downlink signals, and a logic resource demapper may detect the downlink signal, which is mapped to a logic resource area, from among the plurality of downlink signals.

The channel estimator 230 may estimate a channel of the downlink signal and provide the estimated channel value to the LLR generator 240. The LLR generator 240 may calculate LLR values of symbols (or a codeword of the downlink signal) included in the downlink signal and transmit the calculated LLR values to the decoder 250. The decoder 250 may perform a decoding operation according to a coding rate used in an encoder of a base station (or a transmitter) based on the calculated LLR values and restore a data signal (or a data bit) from the downlink signal. The demodulator 260 may demodulate the restored data signal.

When the modem 200 receives an N-th downlink signal, the modem 200 may detect a PDSCH from the N-th downlink signal. Specifically, the channel estimator 230 according to an exemplary embodiment of the inventive concept may perform a channel estimation operation using symbols corresponding to a reference signal for demodulating the PDCCH of the N-th downlink signal. The LLR generator 240 may generate LLR values of symbols corresponding to the PDCCH based on a result of the channel estimation operation, and the decoder 250 may decode the symbols corresponding to the PDCCH based on the generated LLR values. Subsequently, the demodulator 260 may demodulate the PDCCH based on the decoding result and obtain control information from the N-th downlink signal. The modem 200 may detect a PDSCH from the N-th downlink signal based on the control information. In other words, the modem 200 may obtain information regarding symbols at which PDSCHs are located in the N-th downlink signal.

Thereafter, the channel estimator 230 may perform a first channel estimation operation using a reference signal for demodulating the PDSCH. The channel estimator 230 may perform a second channel estimation operation on at least one second symbol between at least two first symbols included in a symbol group unit, each time the first channel estimation operation on the symbol group unit is completed. Specifically, the channel estimator 230 may perform a time-axis or frequency-axis interpolation operation using channel values generated as a result of the first channel estimation operation and generate a channel value corresponding to the at least one second symbol between the first symbols.

Subsequently, the LLR generator 240 may generate an LLR value corresponding to the at least one second symbol based on a result of the second channel estimation operation, and the decoder 250 may decode the at least one second symbol based on the generated LLR value. The demodulator 260 may demodulate the at least one second symbol based on the decoded result.

The buffer manager 270 according to an exemplary embodiment of the inventive concept may receive channel estimation values required for processing the N-th downlink signal from the channel estimator 230 and store the channel estimation values in a buffer Buf. The buffer manager 270 may access the buffer Buf so that the channel estimation values required for generating the LLR value may be provided to the LLR generator 240. The buffer Buf may have a limited capacity to store information required for processing a downlink signal of one TTI. The buffer manager 270 may update the buffer Buf with information required for a new downlink signal, each time the modem 200 processes the new downlink signal. For example, when the modem 200 receives an N+1-th downlink signal after the N-th downlink signal, the buffer manager 270 may update a result of a channel estimation operation on the N-th downlink signal stored in the buffer Buf to a result of a channel estimation operation on the N+1-th downlink signal.

Figure 4:
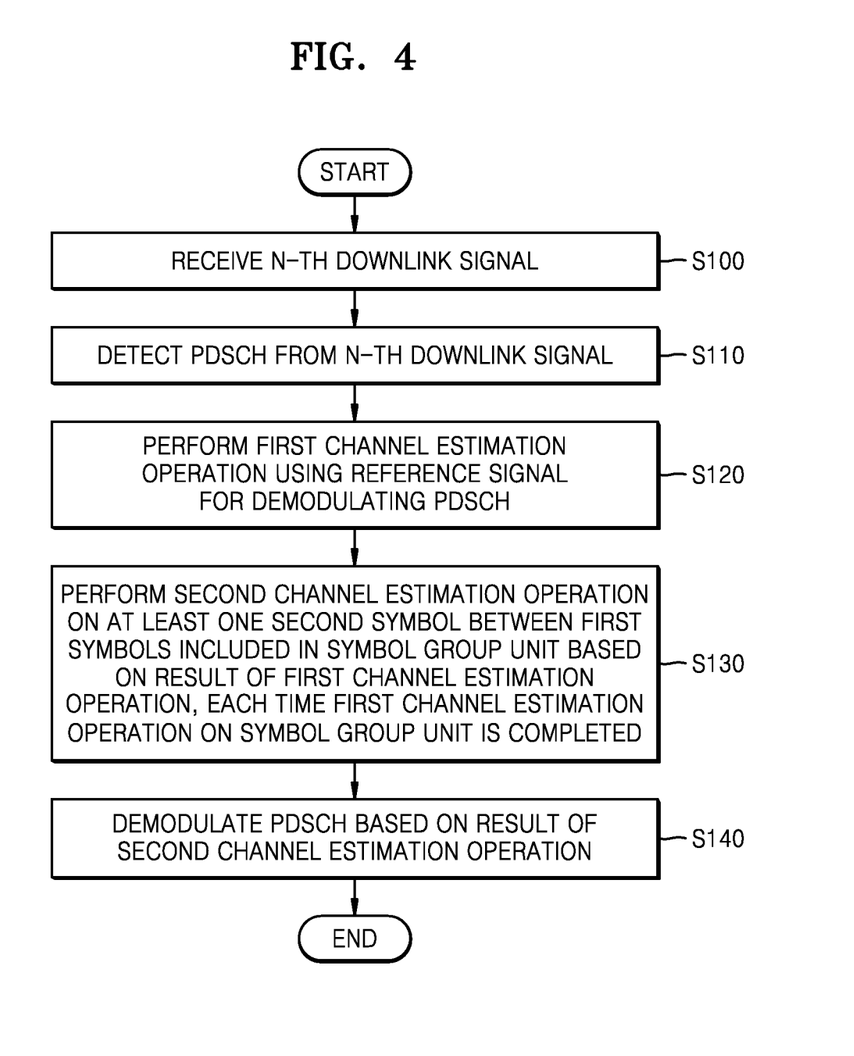
FIG. 4 is a flowchart of a symbol-based processing operation on an N-th downlink signal according to an exemplary embodiment of the inventive concept.

FIG. 4 is a flowchart of a symbol-based processing operation on an N-th downlink signal according to an exemplary embodiment of the inventive concept.

Referring to FIGS. 1 and 4, the modem 130 may receive an N-th downlink signal corresponding to an N-th TTI (S100). The modem 130 may detect a PDSCH from the N-th downlink signal (S110). The modem 130 may perform a first channel estimation operation using a reference signal for demodulating the PDSCH (S120). The modem 130 may perform a second channel estimation operation on at least one second symbol between first symbols included in a symbol group unit based on a result of the first channel estimation operation, each time the first channel estimation operation on the symbol group unit is completed (S130). The modem 130 may demodulate the PDSCH based on a result of the second channel estimation operation (S140).

Figure 5:
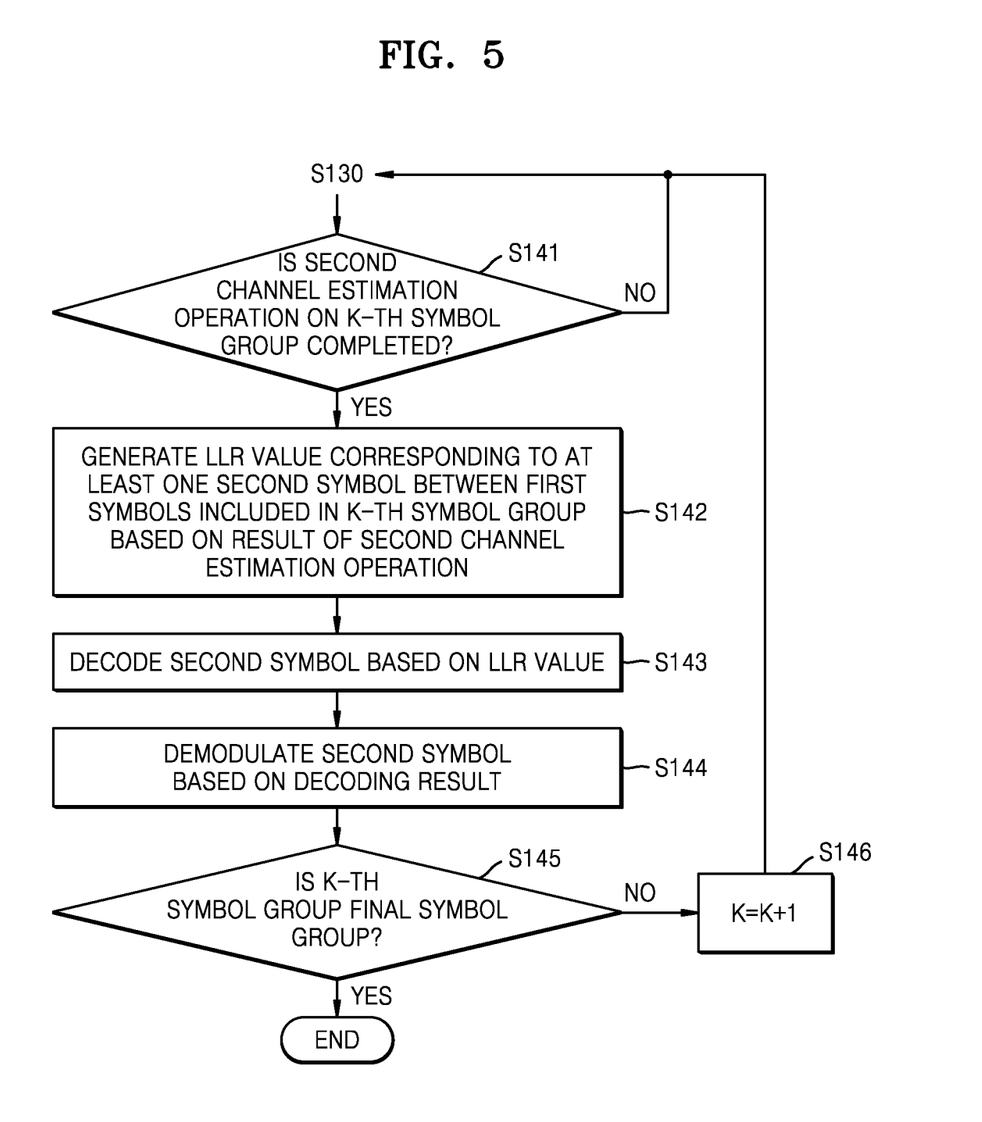
FIG. 5 is a detailed flowchart of operation S140 of FIG. 4 according to an exemplary embodiment of the inventive concept.

FIG. 5 is a detailed flowchart of operation S140 of FIG. 4 according to an exemplary embodiment of the inventive concept.

Referring to FIGS. 1 and 5, after operation S130 of FIG. 4, the modem 130 may determine whether the second channel estimation operation on a K-th symbol group is completed (S141). If the second channel estimation operation on the K-th symbol group is not completed (S141, NO), operation S130 of FIG. 4 may be performed until the second channel estimation operation on the K-th symbol group is completed. Otherwise, if the second channel estimation operation on the K-th symbol group is completed (S141, YES), the modem 130 may generate an LLR value corresponding to at least one second symbol between first symbols included in the K-th symbol group based on a result of the second channel estimation operation (S142). The modem 130 may decode the at least one second symbol based on the generated LLR value (S143). The modem 130 may demodulate the at least one second symbol based on the decoding result (S144). The modem 130 may determine whether the K-th symbol group is a final symbol group of the N-th downlink signal (S145). If the K-th symbol group is the final symbol group of the N-th downlink signal (S145, YES), the modem 130 may complete an operation of processing the N-th downlink signal. Otherwise, if the K-th symbol group is not the final symbol group of the N-th downlink signal (S145, NO), a K value may be counted up (S146) and the process may return to operation S130 of FIG. 4.

Figure 6:
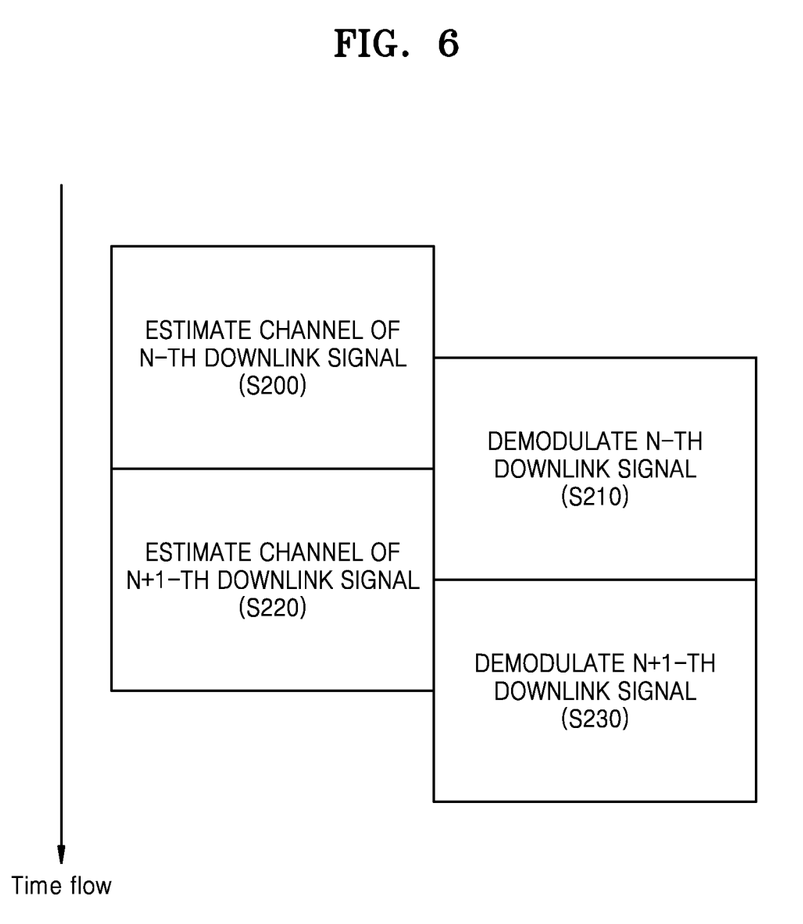
FIG. 6 is a time flow diagram showing a relationship between an operation of processing an N-th downlink signal and an operation of processing an N+1-th downlink signal according to an exemplary embodiment of the inventive concept.

FIG. 6 is a time flow diagram showing a relationship between an operation of processing an N-th downlink signal and an operation of processing an N+1-th downlink signal according to an exemplary embodiment of the inventive concept. Hereinafter, it is assumed that the N+1-th downlink signal is received by a wireless communication device after the N-th downlink signal. As described above, it is assumed that a demodulation operation on a downlink signal includes an LLR generation operation and a decoding operation.

Referring to FIGS. 1 and 6, the modem 130 may estimate a channel of the N-th downlink signal (S200). As described above, the modem 130 may estimate the channel of the N-th downlink signal by variable symbol group units. The modem 130 may demodulate the N-th downlink signal using generated channel estimation values concurrently with the channel estimation operation on the N-th downlink signal, each time a channel estimation operation related to a symbol group is completed (S210). For example, when the estimation of a channel related to a first symbol group in the N-th downlink signal is completed (for example, when the estimation of channels of first symbols included the first symbol group and the estimation of a channel of at least one second symbol between the first symbols are completed), the modem 130 may demodulate the N-th downlink signal using the channel estimation values and concurrently estimate the channel related to the second symbol group in the N-th downlink signal. In other words, the modem 130 according to the present exemplary embodiment may perform a channel estimation operation on the N-th downlink signal and a demodulation operation on the N-th downlink signal concurrently.

Furthermore, the modem 130 may perform a channel estimation operation on the N+1-th downlink signal concurrently with the demodulation of the N-th downlink signal (S220). The modem 130 may demodulate the N+1-th downlink signal concurrently with the channel estimation operation on the N+1-th downlink signal (S230) in substantially the same manner as the processing of the N-th downlink signal.

As described above, the modem 130 according to the present exemplary embodiment may concurrently perform a channel estimation operation and a demodulation operation on a downlink signal and concurrently perform a channel estimation operation between downlink signals and perform a demodulation operation. Thus, the modem 130 may perform a processing operation corresponding to a 5G-communication low-latency service.

Figure 7A:
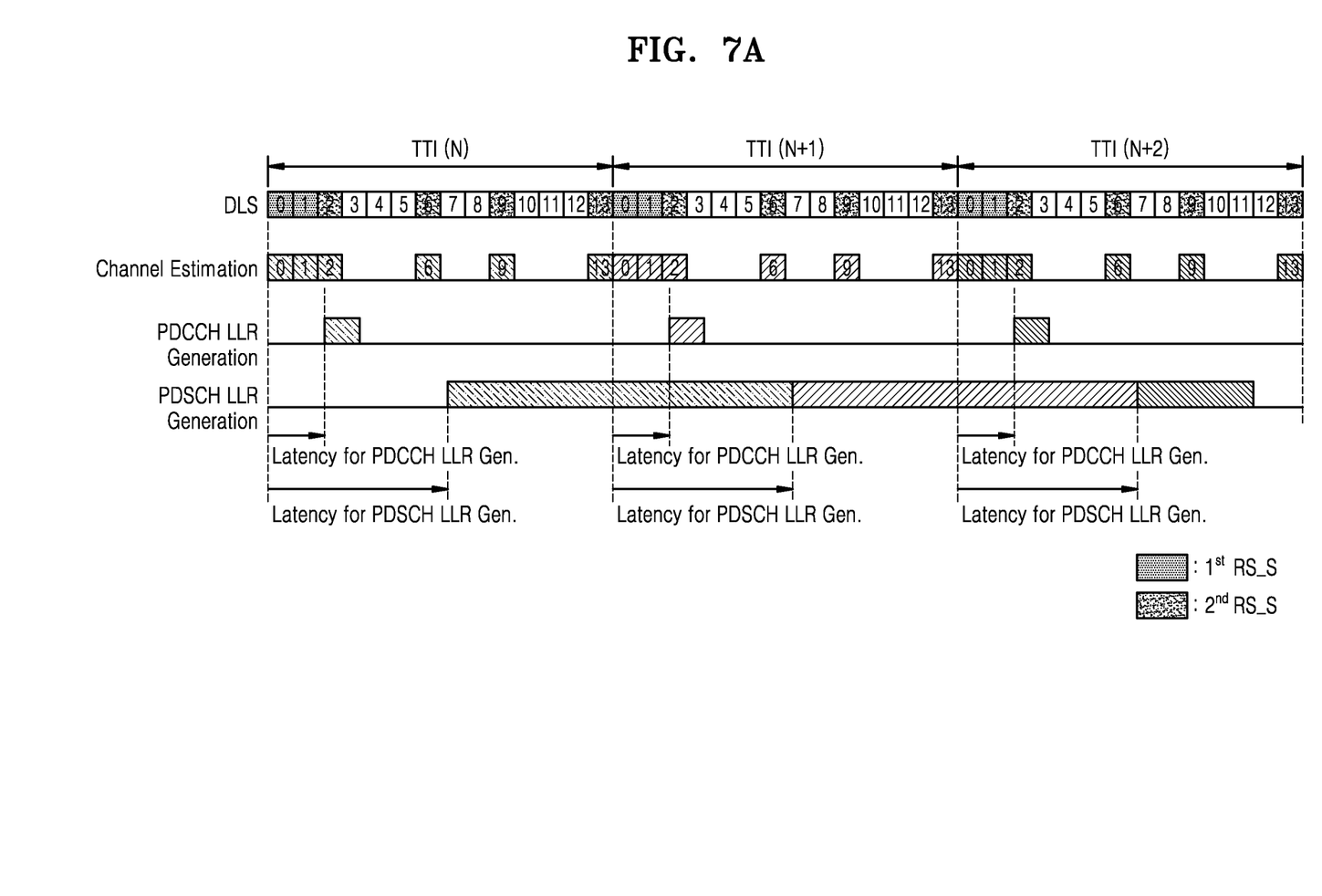
FIGS. 7A and 7B are diagrams for describing examples of a processing method of a wireless communication device according to exemplary embodiments of the inventive concept.
Figure 7B:
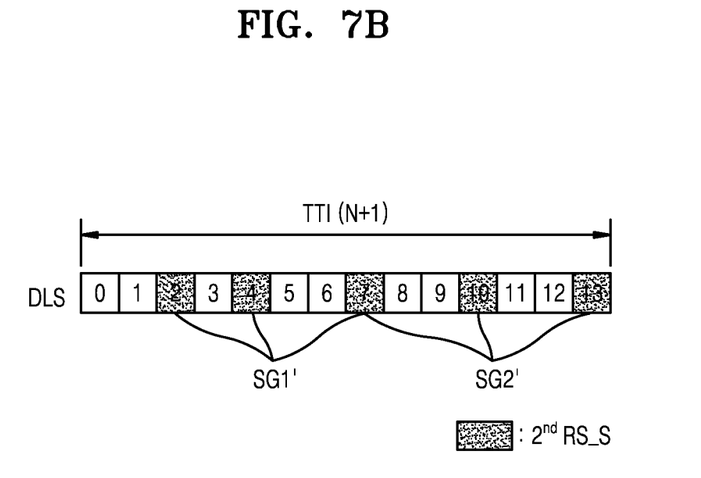

FIGS. 7A and 7B are diagrams for describing examples of a processing method of a wireless communication device according to exemplary embodiments of the inventive concept.

Referring to FIGS. 1 and 7A, the modem 130 may receive an N-th downlink signal of an N-th TTI TTI(N), an N+1-th downlink signal of an N+1-th TTI TTI(N+1), and an N+2-th downlink signal of an N+2-th TTI TTI(N+2). Hereinafter, it is assumed that a downlink signal of one TTI includes fourteen symbols. Additionally, it is assumed that a reference signal $1^{st}$ RS_S for demodulating a PDCCH is located at a first symbol 0 and a second symbol 1 of each downlink signal, and a reference signal $2^{nd}$ RS_S for demodulating a PDSCH is located at a third symbol 2, a seventh symbol 6, a tenth symbol 9, and a fourteenth symbol 13. In addition, it is assumed that a symbol group includes two symbols, a first symbol group SG1 includes a third symbol 2 and a seventh symbol 6, a second symbol group SG2 includes a seventh symbol 6 and a tenth symbol 9, and a third symbol group SG3 includes a tenth symbol 9 and a fourteenth symbol 13. The inventive concept is not limited to the above assumptions and, for example, the inventive concept may be also applied to a case in which the reference signals $1^{st}$ RS_S and $2^{nd}$ RS_S may be located in different patterns in symbols included in the downlink signal.

The modem 130 may estimate a channel of the PDCCH of the N-th downlink signal using the first symbol 0 and the second symbol 1, and generate an LLR value of the PDCCH after a predetermined latency from a time point at which the estimation is completed. Thereafter, the PDCCH may be decoded and demodulated using the LLR value of the PDCCH to detect a PDSCH of the N-th downlink signal.

The modem 130 may perform a channel estimation operation on the first symbol group SG1 and perform a channel estimation operation on the fourth symbol 3, the fifth symbol 4, and the sixth symbol 5 when the channel estimation operation on the first symbol group SG1 is completed. As described above, the modem 130 may perform an interpolation operation using channel estimation values of the first symbol group SG1 and generate channel estimation values of the fourth symbol 3, the fifth symbol 4, and the sixth symbol 5. The modem 130 may generate an LLR value of the PDSCH after a predetermined latency. In other words, the modem 130 may generate LLR values of the first symbol group SG1, the fourth symbol 3, the fifth symbol 4, and the sixth symbol 5.

The modem 130 may perform a channel estimation operation on the second symbol group SG2. When the channel estimation operation on the second symbol group SG2 is completed, a channel estimation operation may be performed on an eighth symbol 7 and a ninth symbol 8. The modem 130 may perform an interpolation operation using channel estimation values of the second symbol group SG2 and generate channel estimation values of the eighth symbol 7 and the ninth symbol 8. The modem 130 may generate LLR values of the eighth symbol 7, the ninth symbol 8, and the tenth symbol 9 of the second symbol group SG2.

The modem 130 may perform a channel estimation operation on the third symbol group SG3. When the channel estimation operation on the third symbol group SG3 is completed, the modem 130 may perform a channel estimation operation on the eleventh symbol 10, the twelfth symbol 11, and the thirteenth symbol 12. The modem 130 may perform an interpolation operation using channel estimation values of the third symbol group SG3 and generate estimation values of the eleventh symbol 10, the twelfth symbol 11, and the thirteenth symbol 12. The modem 130 may generate LLR values of the eleventh symbol 10, the twelfth symbol 11, the thirteenth symbol 12, and the fourteenth symbol 13 of the third symbol group SG3.

In the above-described method, the modem 130 may process an N+1-th downlink signal and an N+2-th downlink signal. Additionally, an operation of generating LLR values of the N-th downlink signal and a channel estimation operation on the N+1-th downlink signal may be performed concurrently.

FIG. 7B illustrates an example in which the number of symbols is set to be different from the number of symbols included in the symbol group of FIG. 7A. Additionally, it is assumed that reference signals $2^{nd}$ RS_S for demodulating a PDSCH are located in a third symbol 2, a fifth symbol 4, an eighth symbol 7, an eleventh symbol 10, and a fourteenth symbol 13 in an N+1-th downlink signal.

Referring to FIG. 7B, in an N+1-th downlink signal corresponding to an N+1-th TTI TTI(N+1), a first symbol group SG1' may be set to include the third symbol 2, the fifth symbol 4, and the eighth symbol 7, and a second symbol group SG2' may be set to include the eighth symbol 7, the eleventh symbol 10, and the fourteenth symbol 13. However, the inventive concept is not limited thereto, and the number of symbols included in a symbol group may be variously set according to a communication environment of the wireless communication device.

Figure 8:
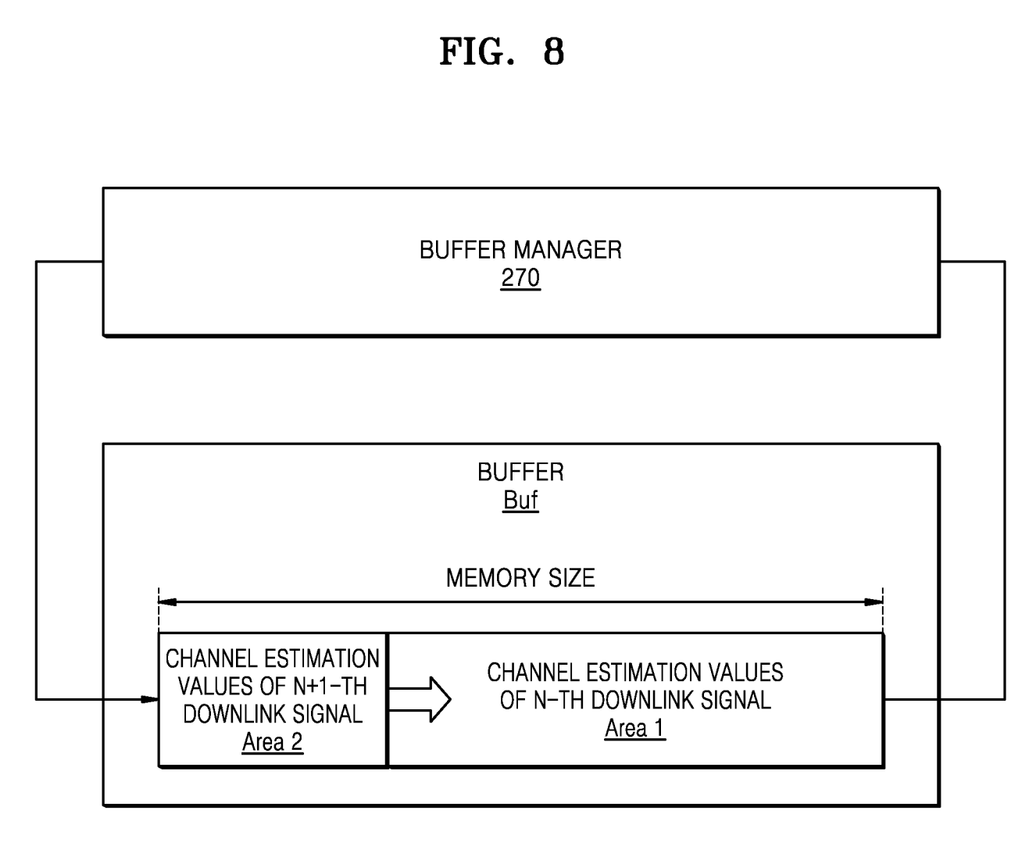
FIG. 8 is a block diagram of a method of using a buffer, according to an exemplary embodiment of the inventive concept.

FIG. 8 is a block diagram of a method of using a buffer, according to an exemplary embodiment of the inventive concept.

Referring to FIG. 8, a buffer manager 270 may update information required for processing a downlink signal stored in the buffer Buf. The buffer Buf may have a memory area for storing information required to process a downlink signal of one TTI. In an exemplary embodiment of the inventive concept, when the buffer Buf stores channel estimation values of an N-th downlink signal in a first area Area_1, the buffer manager 270 may access the buffer Buf, read the channel estimation values of the N-th downlink signal from the first area Area1, and provide the channel estimation values of the N-th downlink signal to the LLR generator (refer to 240 in FIG. 3). Simultaneously, when channel estimation values of an N+1-th downlink signal are generated, the buffer manager 270 may store the generated channel estimation values of the N+1-th downlink signal in a second area Area_2 of the buffer Buf. When a channel estimation operation is performed on the N+1-th downlink signal, the second area Area_2 in which the channel estimation values of the N+1-th downlink signal are stored may gradually increase. Finally, the buffer Buf may store only the channel estimation values of the N+1-th downlink signal.

Figure 9:
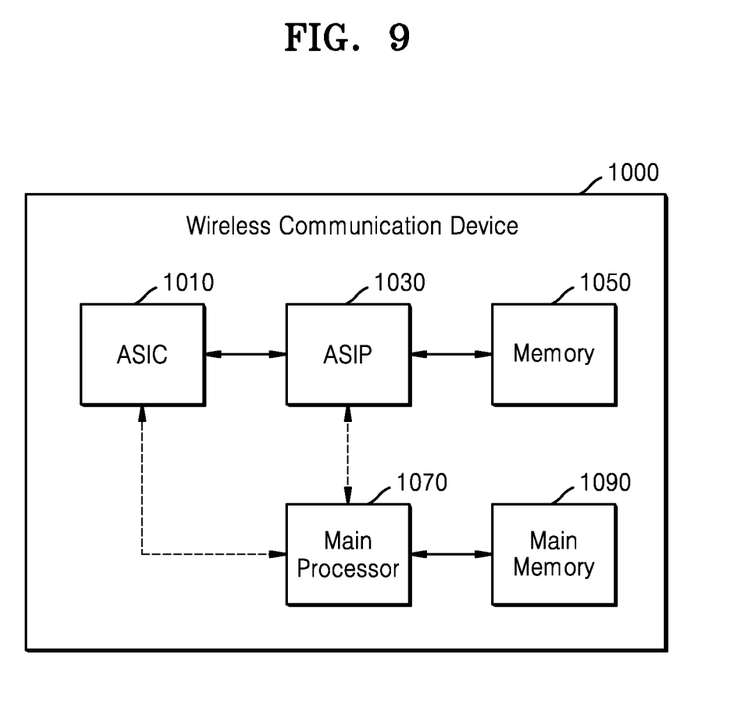
FIG. 9 is a block diagram of a wireless communication device according to an exemplary embodiment of the inventive concept.

FIG. 9 is a block diagram of a wireless communication device according to an exemplary embodiment of the inventive concept.

Referring to FIG. 9, a wireless communication device 1000, which is an example of a communication device, may include an application specific integrated circuit (ASIC) 1010, an application specific instruction set processor (ASIP) 1030, a memory 1050, a main processor 1070, and a main memory 1090. At least two of the ASIC 1010, the ASIP 1030, and the main processor 1070 may communicate with one another. Furthermore, at least two of the ASIC 1010, the ASIP 1030, the memory 1050, the main processor 1070, and the main memory 1090 may be embedded in a single chip.

The ASIP 1030, which may be a customized IC for specific purposes, may support a dedicated instruction set for a specific application and execute instructions included in the instruction set. The memory 1050 may communicate with the ASIP 1030 and serve as a non-transitory storage device to store a plurality of instructions executed by the ASIP 1030. In exemplary embodiments of the inventive concept, the memory 1050 may store the symbol-based processing module 135 of FIG. 1. The memory 1050 may include an arbitrary type of memory that may be accessed by the ASIP 1030, for example, random access memory (RAM), read-only memory (ROM), a tape, a magnetic disc, an optical disc, a volatile memory, a non-volatile memory, or a combination thereof, but the memory 1050 is not limited thereto. The ASIP 1030 or the main processor 1070 may execute a series of instructions stored in the memory 1050 and perform a symbol-based processing operation.

The main processor 1070 may execute a plurality of instructions and control the wireless communication device 1000. For example, the main processor 1070 may control the ASIC 1010 and the ASIP 1030 and process data received through a wireless communication network or process users' inputs to the wireless communication device 1000. The main memory 1090 may communicate with the main processor 1070 and serve as a non-transitory storage device to store a plurality of instructions executed by the main processor 1070.

While the inventive concept has been particularly shown and described with reference to exemplary embodiments thereof, it will be understood by those of ordinary skill in the art that various changes in form and details may be made thereto without departing from the spirit and scope of the inventive concept as set forth by the following claims.

What is claimed is:

1. A symbol-based processing method for downlink signals of a wireless communication device, the method comprising:
   receiving a first downlink signal comprising a plurality of symbols;
   detecting a physical downlink shared channel (PDSCH) from the first downlink signal;
   performing a first channel estimation operation using a first reference signal for demodulating the PDSCH;
   performing a second channel estimation operation on at least one second symbol between at least two first symbols included in a symbol group unit based on a result of the first channel estimation operation, each time the first channel estimation operation on the symbol group unit is completed; and
   performing a demodulation operation on the PDSCH based on a result of the second channel estimation operation,
   wherein performing the second channel estimation operation comprises performing a time-axis or frequency-axis interpolation operation using channel values generated as the result of the first channel estimation operation and generating channel values corresponding to the at least one second symbol between the at least two first symbols.

2. The processing method of claim 1, wherein the first downlink signal corresponds to one transmission time interval (TTI), and a length of the TTI is variable according to a communication environment of the wireless communication device.

3. The processing method of claim 1, wherein detecting the PDSCH comprises:
   performing a third channel estimation operation using symbols corresponding to a second reference signal for demodulating a physical downlink control channel (PDCCH) of the first downlink signal;
   demodulating the PDCCH based on a result of the third channel estimation operation; and
   detecting the PDSCH based on a result of the demodulating of the PDCCH.

4. The processing method of claim 3, wherein the symbols corresponding to the second reference signal comprise a first symbol and a second symbol of the first downlink signal.

5. The processing method of claim 3, wherein demodulating the PDCCH comprises:
   generating log likelihood ratio (LLR) values of symbols corresponding to the PDCCH based on the result of the third channel estimation operation;
   decoding the symbols corresponding to the PDCCH using the LLR values to generate a decoding result; and
   demodulating the PDCCH using the decoding result.

6. The processing method of claim 1, wherein the first reference signal comprises a demodulation-reference signal (DM-RS) that is specific to the wireless communication device.

7. The processing method of claim 1, wherein the symbol group unit corresponds to a mini-slot unit for the first downlink signal.

8. The processing method of claim 1, wherein the symbol group unit is variable according to a communication environment of the wireless communication device.

9. The processing method of claim 1, wherein performing the demodulation operation on the PDSCH comprises:
   generating a log likelihood ratio (LLR) value corresponding to the at least one second symbol based on the result of the second channel estimation operation;
   decoding the second symbol using the LLR value to generate a decoding result; and
   demodulating the second symbol using the decoding result.

10. The processing method of claim 1, wherein the wireless communication device receives a second downlink signal before receiving the first downlink signal, and further comprises a buffer,
   wherein the processing method further comprises updating a result of a channel estimation operation on the second downlink signal stored in the buffer to a result of a channel estimation operation on the first downlink signal.

11. The processing method of claim 1, wherein the wireless communication device receives a second downlink signal before receiving the first downlink signal, and wherein the first downlink signal corresponds to a first transmission time interval (TTI), and the second downlink signal corresponds to a second TTI that is followed by the first TTI.

12. The processing method of claim 1, wherein the first reference signal comprises a first symbol group and a second symbol group, wherein the first symbol group comprises one same symbol as the second symbol group.

13. The processing method of claim 12, wherein, when the first symbol group is located in front of the second symbol group with respect to a time axis, the demodulation operation related to the first symbol group is performed concurrently with the second channel estimation operation related to the second symbol group.

14. A wireless communication device comprising:
a radio-frequency (RF) integrated circuit configured to receive a first downlink signal from a base station;
a buffer configured to store information required for processing the first downlink signal; and
a baseband processor configured to process the first downlink signal,
wherein the baseband processor performs a channel estimation operation on a first symbol group of a first reference signal for demodulating a physical downlink shared channel (PDSCH) of the first downlink signal, performs a second channel estimation operation on at least one second symbol between at least two first symbols included in the first symbol group based on a result of the channel estimation operation, and performs a demodulation operation on the at least one second symbol, and
wherein, when channel estimation values of a second downlink signal that is received from the RF integrated circuit before the first downlink signal are stored in the buffer and when channel estimation values of the first downlink signal are generated as results of the channel estimation operation, the baseband processor updates the buffer with the channel estimation values of the first downlink signal in order of generation.

15. The wireless communication device of claim 14, wherein the first reference signal further comprises a second symbol group located after the first symbol group with respect to a time axis, and wherein the baseband processor performs a channel estimation operation on the second symbol group concurrently with the demodulation operation on the at least one second symbol.

16. The wireless communication device of claim 15, wherein the first symbol group comprises one same symbol as the second symbol group.

17. A non-transitory computer-readable storage medium comprising commands, wherein, when the commands are executed by a processor included in a wireless communication device, the processor detects a physical downlink shared channel (PDSCH) from a first downlink signal that is externally received, the processor performs a first channel estimation operation using a first reference signal for demodulating the PDSCH, the processor performs a second channel estimation operation on at least one second symbol between at least two first symbols included in a symbol group unit based on a result of the first channel estimation operation, each time the first channel estimation operation on the symbol group unit is completed, and wherein the processor performs a demodulation operation on the PDSCH based on a result of the second channel estimation operation, wherein the wireless communication device receives a second downlink signal before receiving the first downlink signal, and further comprises a buffer, and wherein the processor updates a result of a channel estimation operation on the second downlink signal stored in the buffer to a result of a channel estimation operation on the first downlink signal.

* * * * *